(12) United States Patent
Matlack et al.

(10) Patent No.: US 9,205,533 B2
(45) Date of Patent: Dec. 8, 2015

(54) CLAMPING METHOD AND APPARATUS

(71) Applicant: The Boeing Company, Chicago, IL (US)

(72) Inventors: Mike P. Matlack, St. Charles, MO (US); Kurt A. Burton, Berkley, MO (US); John A. Baumann, St. Louis, MO (US)

(73) Assignee: The Boeing Company, Chicago, IL (US)

( * ) Notice: Subject to any disclaimer, the term of this patent is extended or adjusted under 35 U.S.C. 154(b) by 40 days.

(21) Appl. No.: 14/257,357

(22) Filed: Apr. 21, 2014

(65) Prior Publication Data

US 2015/0298297 A1 Oct. 22, 2015

(51) Int. Cl.
*B23K 20/12* (2006.01)
*B25B 1/24* (2006.01)

(52) U.S. Cl.
CPC ............. *B25B 1/24* (2013.01); *B23K 20/123* (2013.01); *B23K 20/126* (2013.01)

(58) Field of Classification Search
None
See application file for complete search history.

(56) References Cited

U.S. PATENT DOCUMENTS

| | | | | |
|---|---|---|---|---|
| 3,122,118 | A * | 2/1964 | Cooper | 269/20 |
| 3,226,278 | A * | 12/1965 | Scofield, Sr. et al. | 156/497 |
| 3,747,184 | A * | 7/1973 | Zaiss et al. | 228/4.1 |
| 4,744,501 | A * | 5/1988 | Sakaguchi et al. | 228/102 |
| 5,460,317 | A | 10/1995 | Thomas et al. | |
| 6,068,178 | A * | 5/2000 | Michisaka | 228/112.1 |
| 6,302,315 | B1 * | 10/2001 | Thompson | 228/112.1 |
| 6,854,632 | B1 * | 2/2005 | Larsson | 228/2.1 |
| 7,642,481 | B2 * | 1/2010 | Kismarton et al. | 219/121.63 |
| 7,966,713 | B2 * | 6/2011 | Burton et al. | 29/559 |
| 8,164,021 | B1 * | 4/2012 | Ferrando | 219/78.13 |
| 2005/0040209 | A1 * | 2/2005 | Stotler et al. | 228/102 |
| 2005/0045693 | A1 * | 3/2005 | Buchheit et al. | 228/112.1 |
| 2005/0092817 | A1 * | 5/2005 | Baumann et al. | 228/212 |
| 2005/0093219 | A1 * | 5/2005 | Baumann | 269/166 |
| 2006/0102689 | A1 * | 5/2006 | Trapp et al. | 228/2.1 |
| 2007/0000972 | A1 * | 1/2007 | Koga et al. | 228/112.1 |
| 2008/0083817 | A1 * | 4/2008 | Baumann et al. | 228/102 |
| 2008/0084018 | A1 * | 4/2008 | Baumann et al. | 269/271 |
| 2008/0217380 | A1 * | 9/2008 | Chua et al. | 228/176 |
| 2009/0065553 | A1 * | 3/2009 | Burg et al. | 228/2.1 |
| 2009/0152328 | A1 * | 6/2009 | Okamoto et al. | 228/112.1 |
| 2009/0250505 | A1 * | 10/2009 | Matlack et al. | 228/112.1 |
| 2013/0255884 | A1 * | 10/2013 | Baumann et al. | 156/538 |
| 2013/0276299 | A1 * | 10/2013 | Kiridena et al. | 29/650 |
| 2014/0061283 | A1 * | 3/2014 | Shoji et al. | 228/2.1 |
| 2014/0183245 | A1 * | 7/2014 | Yamaguchi et al. | 228/2.1 |
| 2014/0183246 | A1 * | 7/2014 | Saitou et al. | 228/2.1 |

FOREIGN PATENT DOCUMENTS

GB 706406 A * 3/1954

* cited by examiner

*Primary Examiner* — Kiley Stoner

(57) ABSTRACT

One example of the present disclosure relates to a method of processing first and second workpieces. The method includes constraining the second workpiece; abutting first and second workpieces together to form a joint; applying first and second selectively adjustable forces against the first workpiece to bias the first workpiece against the second workpiece; friction stir welding the first and second workpieces along the joint; maintaining the forces equal to each other while friction stir welding; and automatically varying at least one of the forces responsive to thermal size variations of the first and second workpieces. An apparatus for carrying out this method is also provided.

22 Claims, 10 Drawing Sheets

… (US 9,205,533 B2)

CLAMPING METHOD AND APPARATUS

BACKGROUND

Friction stir welding is a thermally dynamic process where the components being jointed grow as a result of thermal expansion. Rigidly clamping the weldment components during friction stir welding operations may lead to buckling of the weldment as a result of over-constrainment thereof.

SUMMARY

Accordingly, apparatus and method, intended to address the above-identified concerns, would find utility.

One example of the present disclosure relates to a method of processing a first workpiece, including a first edge and a second edge, and a second workpiece, including a first edge and a second edge. The method includes constraining the second workpiece to be incapable of moving in a first direction along a surface; abutting the second edge of the first workpiece against the second edge of the second workpiece to form a joint; applying a first selectively adjustable force and a second selectively adjustable force against the first edge of the first workpiece to bias the second edge of the first workpiece against the second edge of the second workpiece; friction stir welding the first workpiece to the second workpiece along the joint; maintaining the first selectively adjustable force and the second selectively adjustable force equal to each other while friction stir welding the first workpiece to the second workpiece along the joint; and automatically varying at least one of the first selectively adjustable force and the second selectively adjustable force responsive to thermal size variations of the first workpiece and the second workpiece associated with friction stir welding the first workpiece to the second workpiece.

BRIEF DESCRIPTION OF THE DRAWINGS

Figure 1:
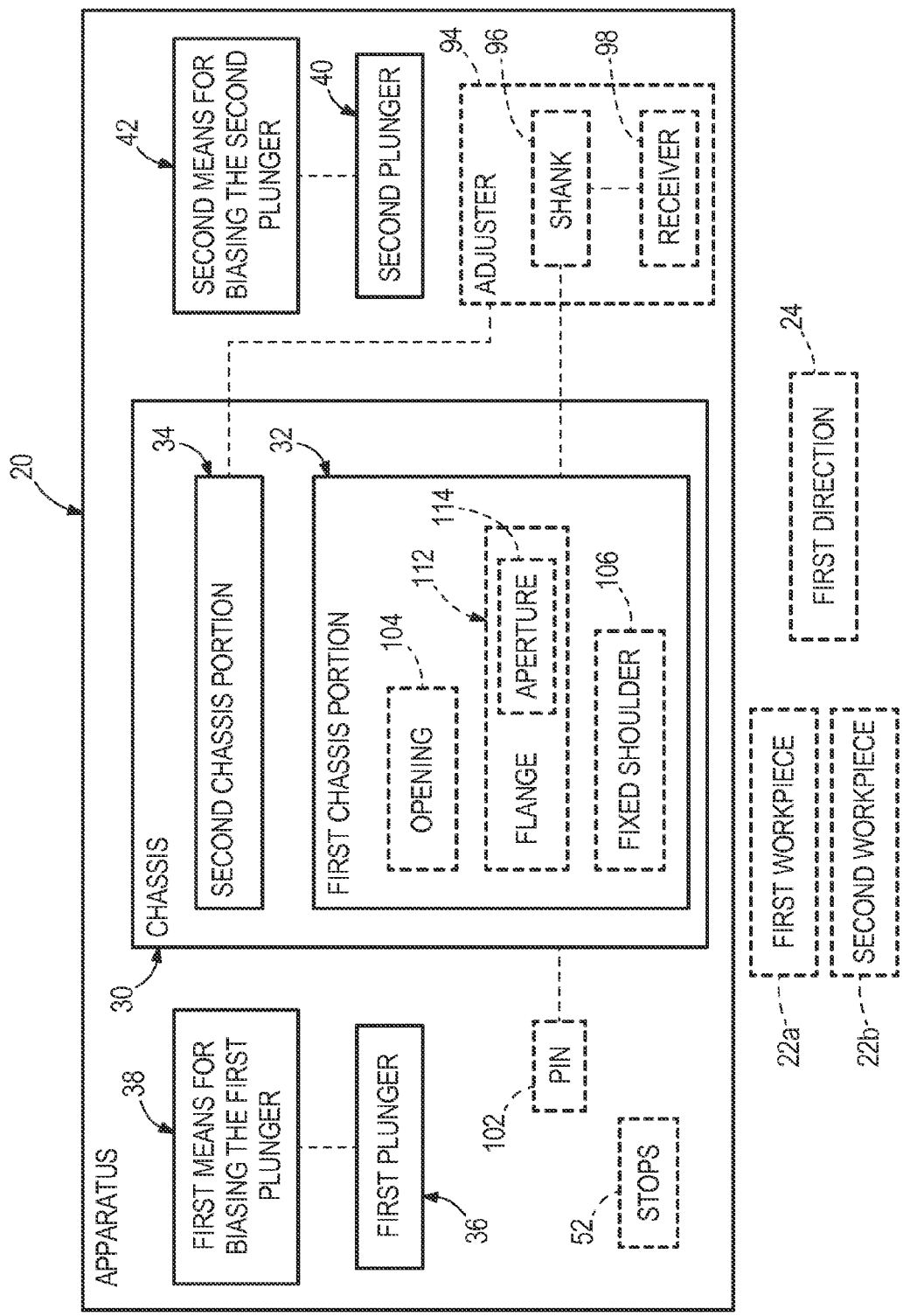
Figure 2:
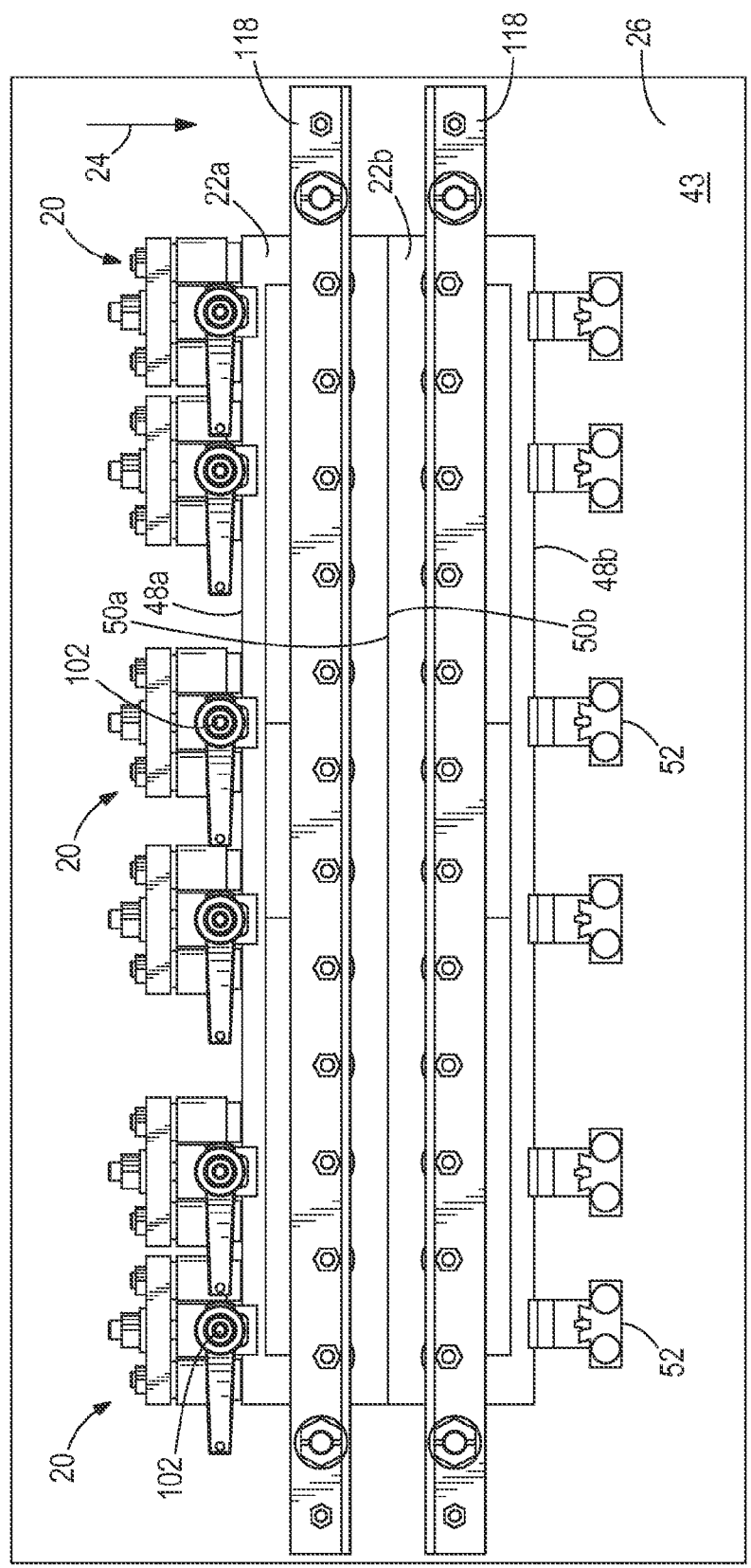
Figure 3:
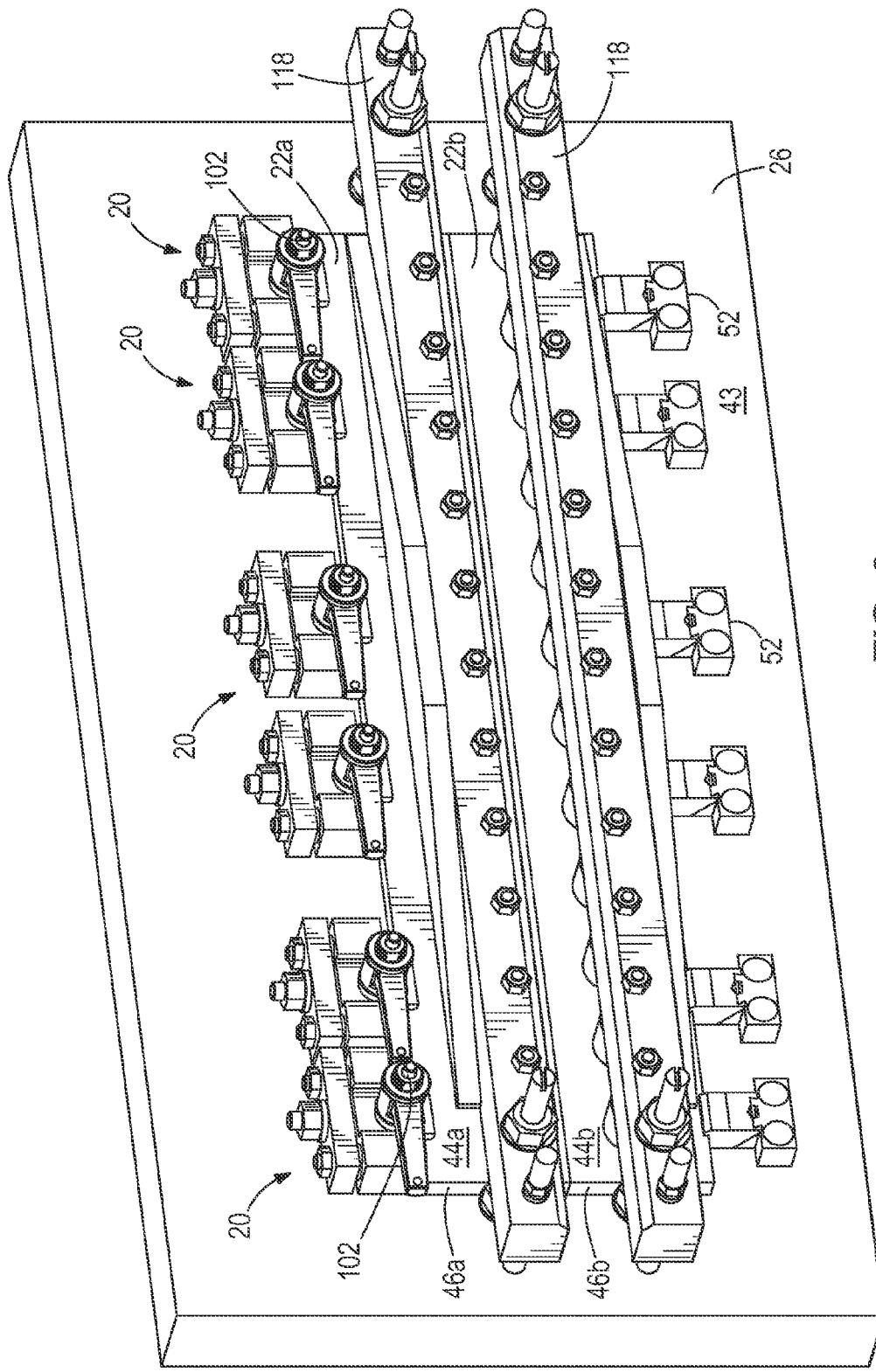
Figure 4:
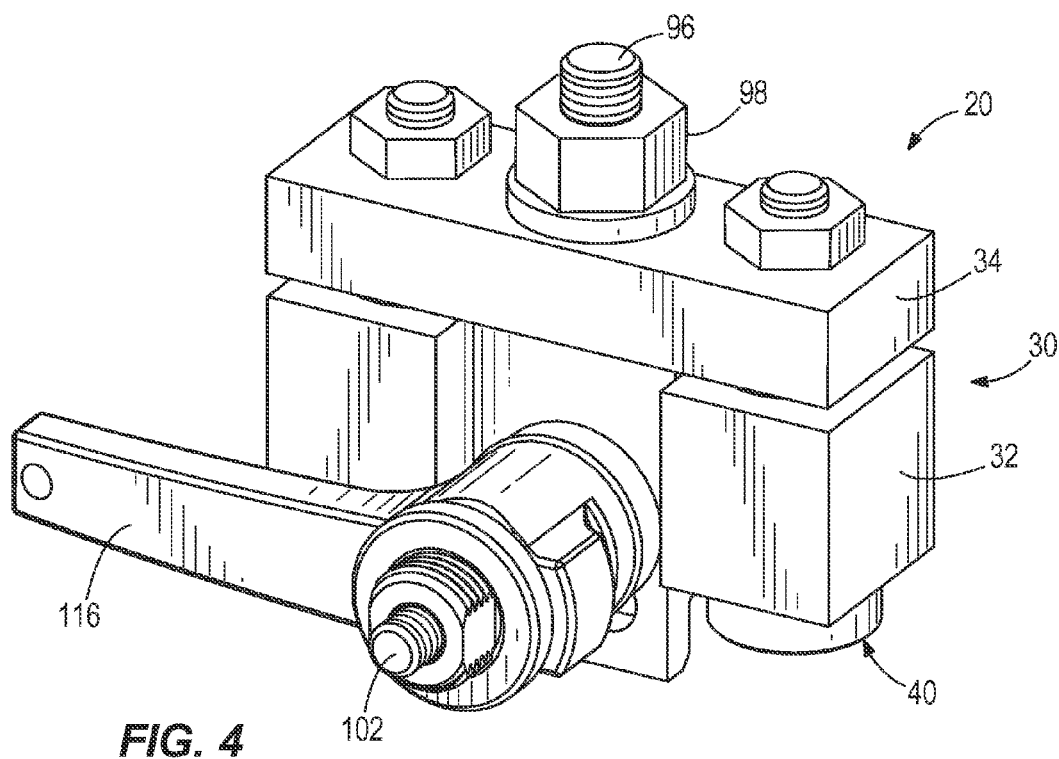
Figure 5:
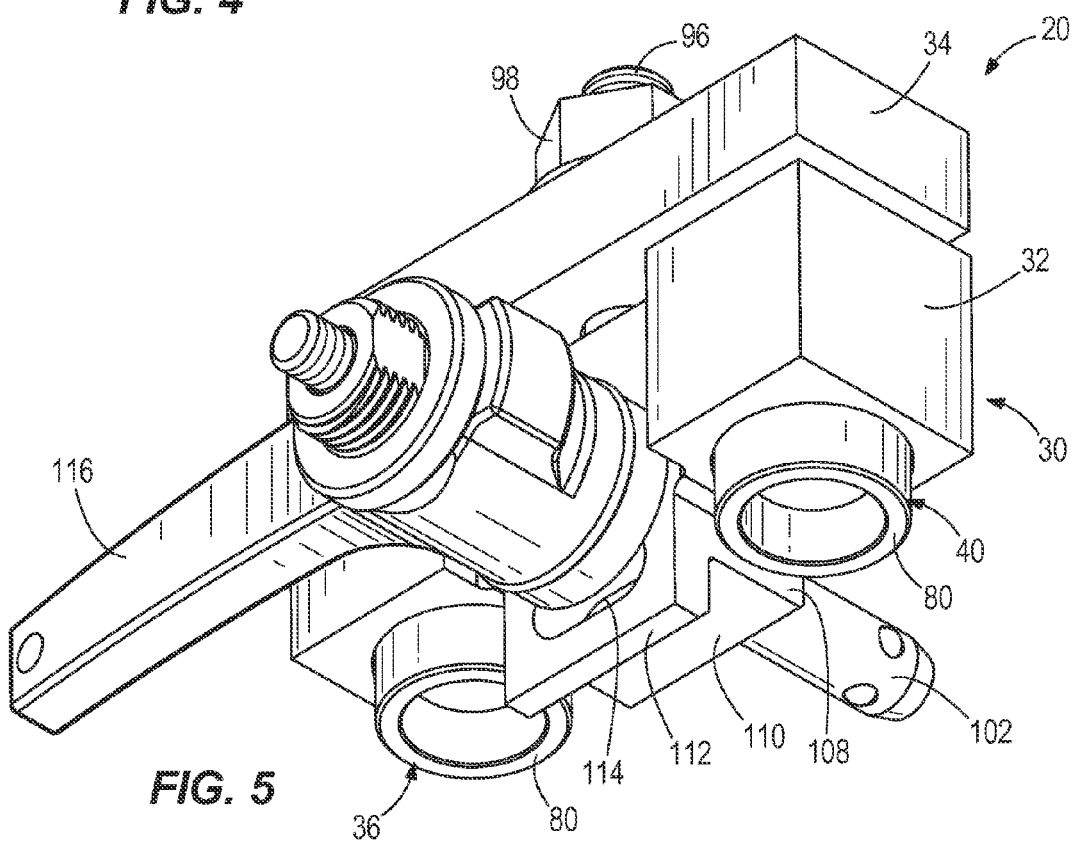
Figure 6:
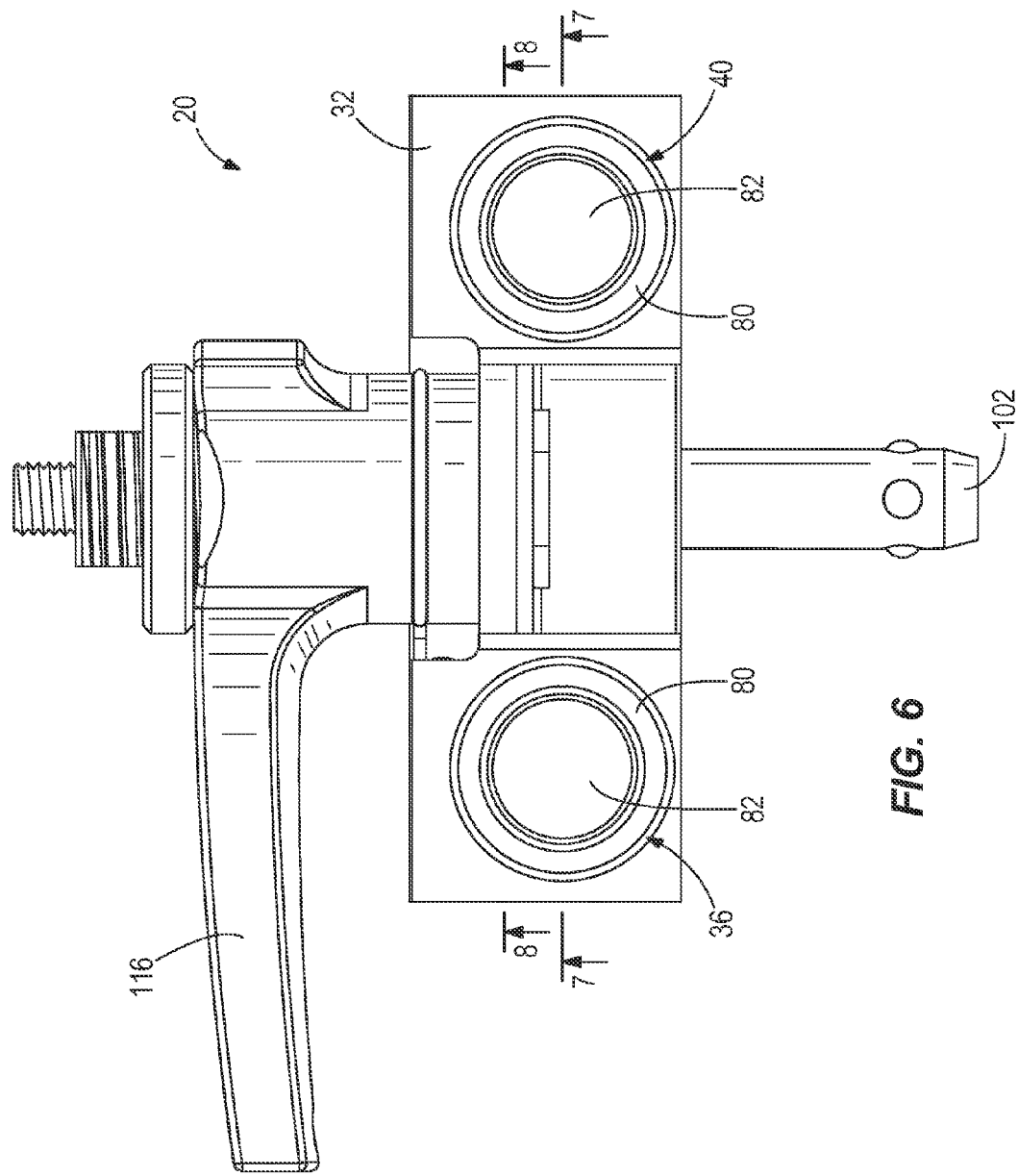
Figure 7:
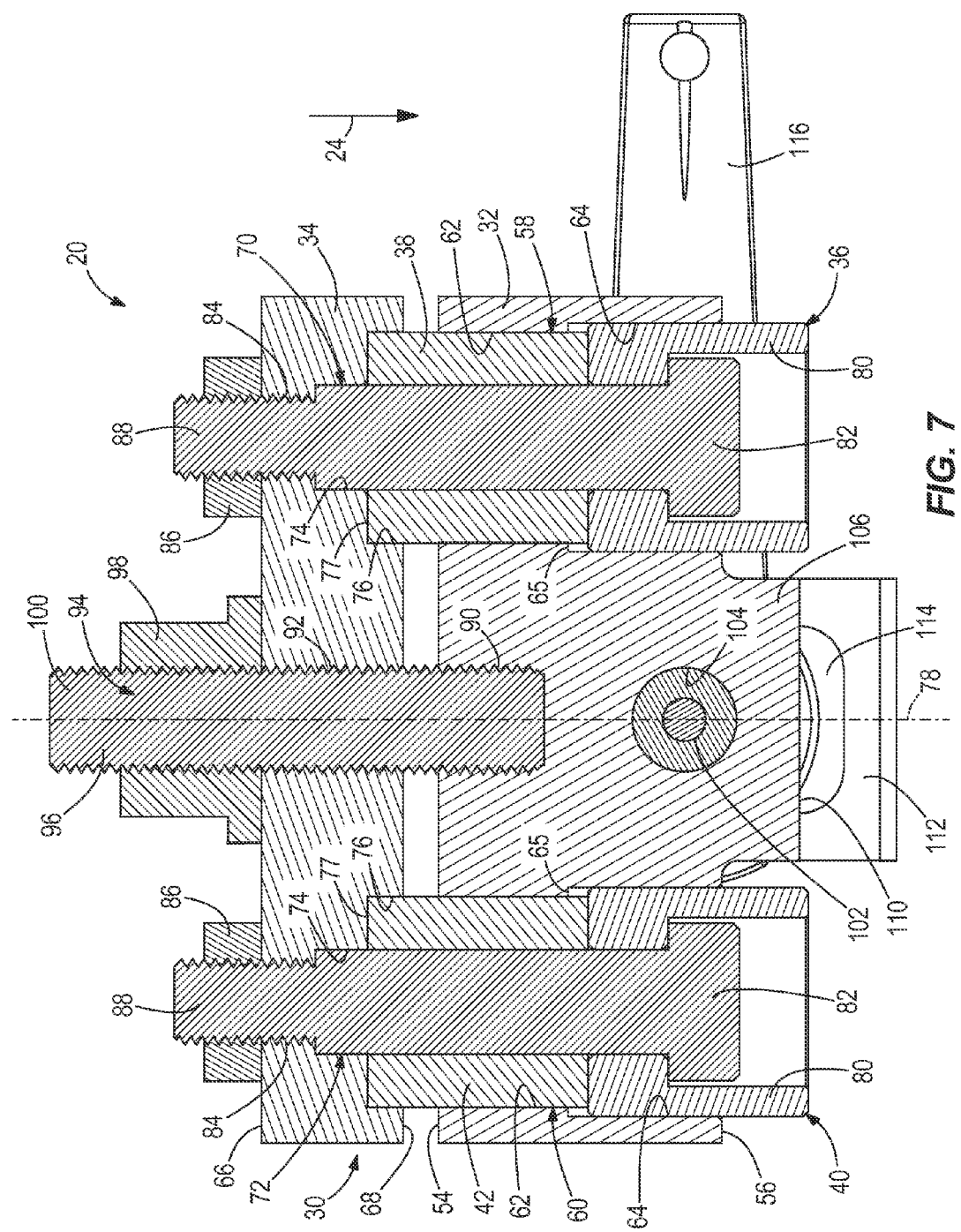
Figure 8:
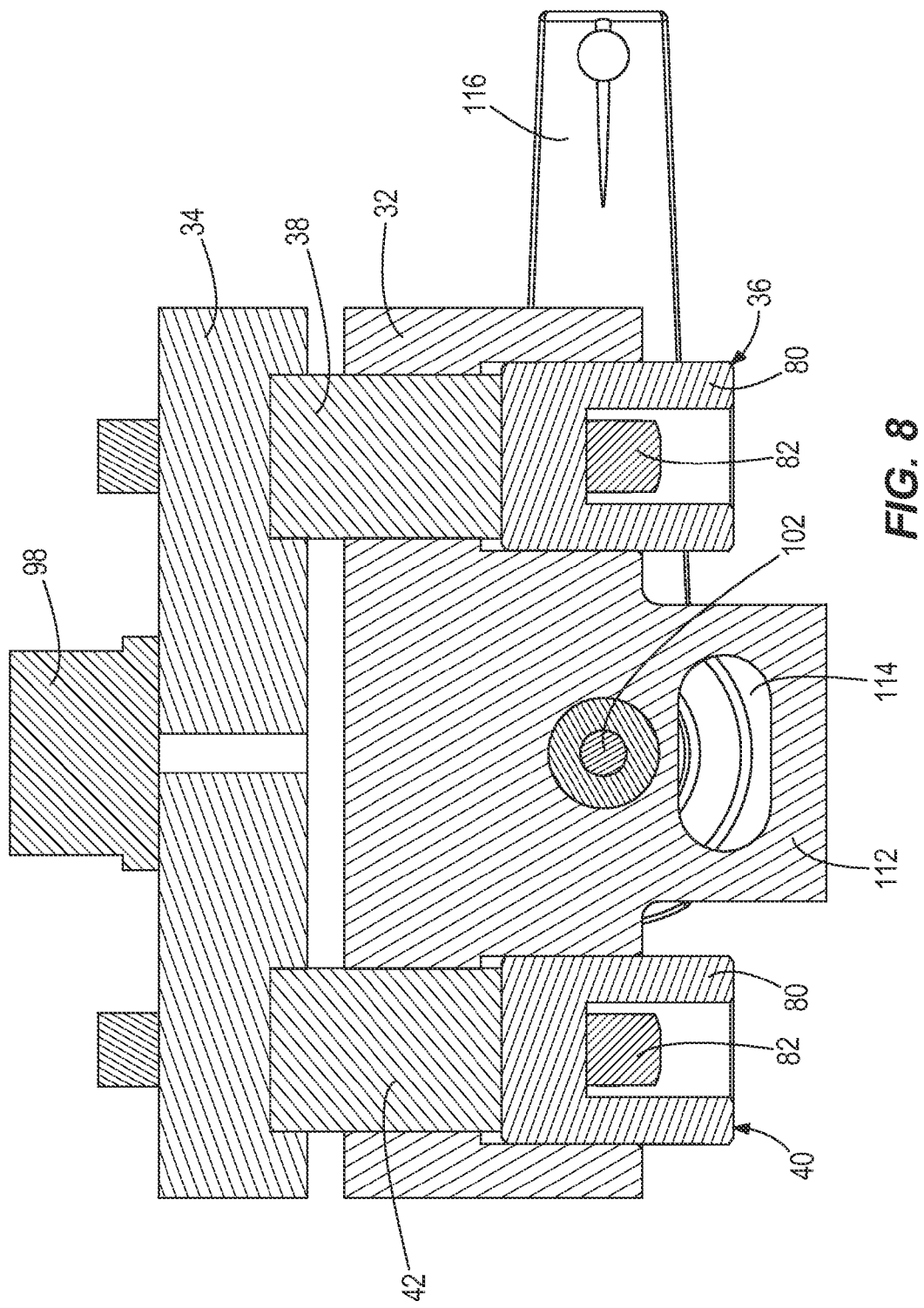
Figure 9:
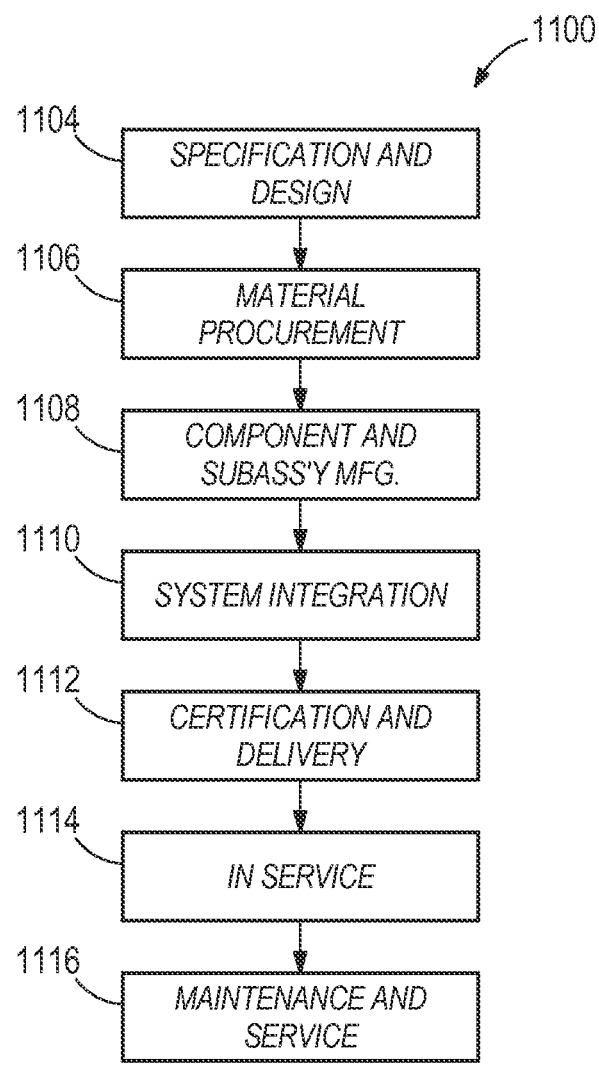
Figure 10:
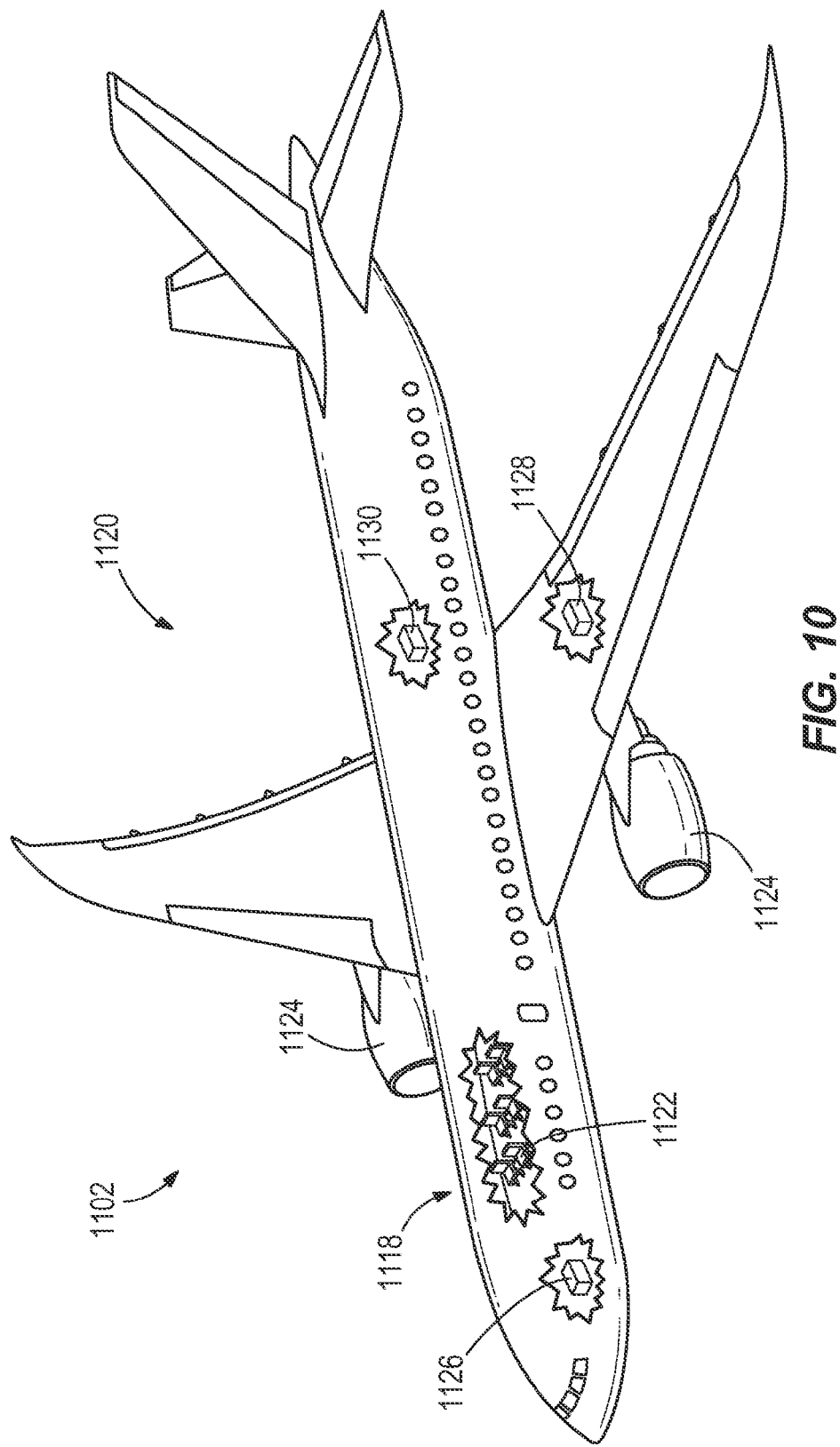

Having thus described examples of the disclosure in general terms, reference will now be made to the accompanying drawings, which are not necessarily drawn to scale, and wherein like reference characters designate the same or similar parts throughout the several views, and wherein:

FIG. 1 is a block diagram of an apparatus for biasing a first workpiece in a first direction along a surface against a second workpiece, according to one aspect of the present disclosure;

FIG. 2 is a schematic top plan view of the apparatus, the first workpiece, the second workpiece and the surface, according to one aspect of the disclosure;

FIG. 3 is a schematic perspective view of the apparatus, the first workpiece, the second workpiece and the surface;

FIG. 4 is a schematic perspective view of the apparatus of FIG. 1, according to one aspect of the disclosure;

FIG. 5 is another schematic perspective view of the apparatus of FIG. 1, according to one aspect of the disclosure;

FIG. 6 is a schematic end elevation view of the apparatus, according to one aspect of the disclosure;

FIG. 7 is a schematic cross-sectional view of the apparatus along line 7-7 in FIG. 6, according to one aspect of the disclosure;

FIG. 8 is a schematic cross-sectional view of the apparatus along line 8-8 in FIG. 6, according to one aspect of the disclosure;

FIG. 9 is a flow diagram of aircraft production and service methodology;

FIG. 10 is a schematic illustration of an aircraft; and

Figure 11:
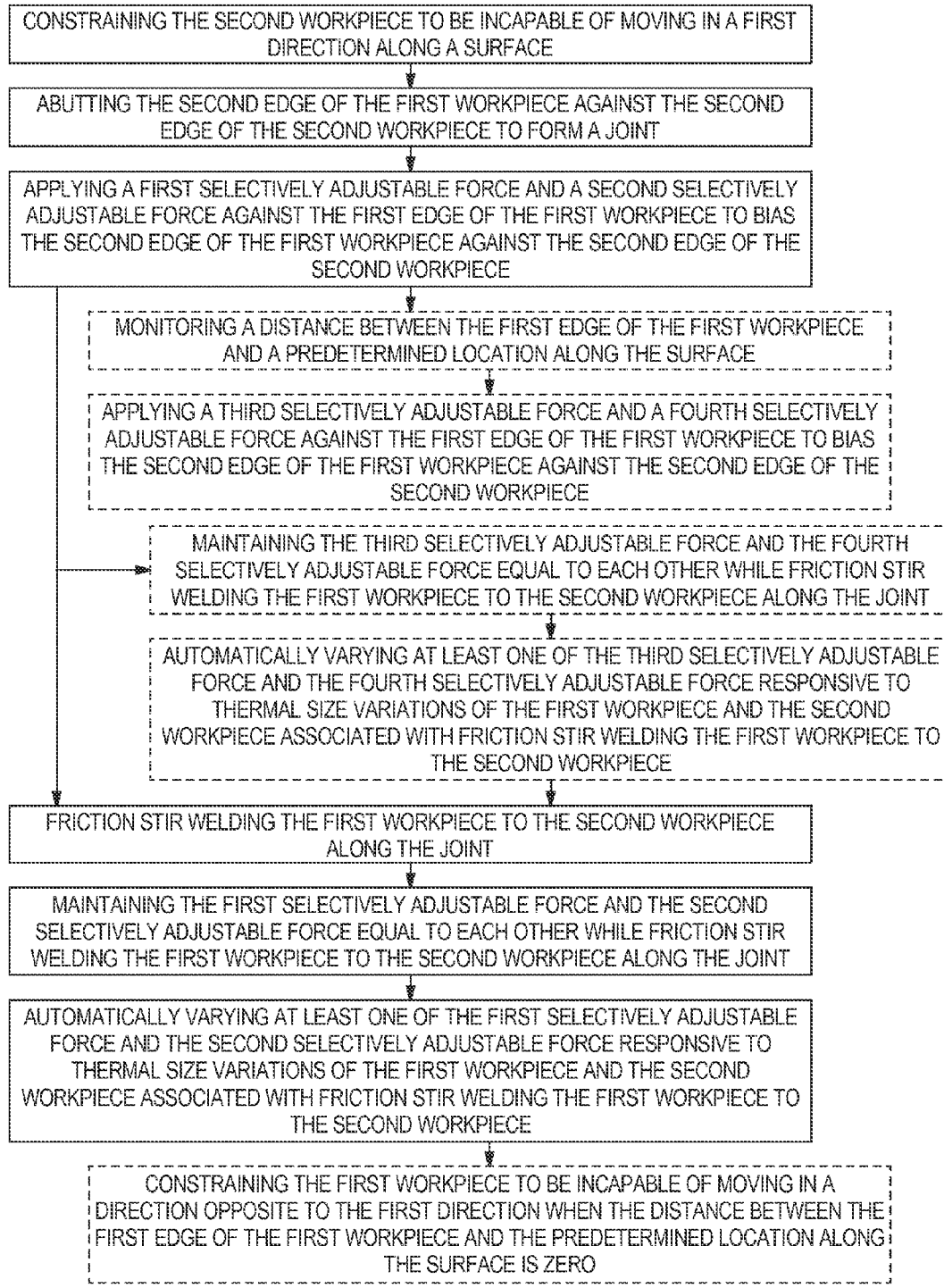

FIG. 11 is a block diagram of a method, according to one aspect of the disclosure.

In the block diagram(s) referred to above, solid lines connecting various elements and/or components may represent mechanical, electrical, fluid, optical, electromagnetic and other couplings and/or combinations thereof. As used herein, "coupled" means associated directly as well as indirectly. For example, a member A may be directly associated with a member B, or may be indirectly associated therewith, e.g., via another member C. Couplings other than those depicted in the block diagrams may also exist. Dashed lines, if any, connecting the various elements and/or components represent couplings similar in function and purpose to those represented by solid lines; however, couplings represented by the dashed lines are either selectively provided or relate to alternative or optional aspects of the disclosure. Likewise, any elements and/or components, represented with dashed lines, indicate alternative or optional aspects of the disclosure. Environmental elements, if any, are represented with dotted lines.

In the block diagram(s) referred to above, the blocks may also represent operations and/or portions thereof. Lines connecting the various blocks do not imply any particular order or dependency of the operations or portions thereof.

DETAILED DESCRIPTION

In the following description, numerous specific details are set forth to provide a thorough understanding of the disclosed concepts, which may be practiced without some or all of these particulars. In other instances, details of known devices and/or processes have been omitted to avoid unnecessarily obscuring the disclosure. While some concepts will be described in conjunction with specific examples, it will be understood that these examples are not intended to be limiting.

Reference herein to "one example" or "one aspect" means that one or more feature, structure, or characteristic described in connection with the example or aspect is included in at least one implementation. The phrase "one example" or "one aspect" in various places in the specification may or may not be referring to the same example or aspect.

Referring generally to FIGS. 1-8, and with particular reference to FIG. 1, one example of the present disclosure relates to an apparatus 20 for biasing a first workpiece 22a in a first direction 24 along a surface 26 against a second workpiece 22b. The second workpiece 22b is incapable of moving in the first direction 24. The apparatus 20 generally includes a chassis 30 including a first chassis portion 32 and a second chassis portion 34, adjustably movable relative to the first chassis portion 32; a first plunger 36 is movable relative to the first chassis portion 32; first means 38 for biasing the first plunger 36 away from the second chassis portion 34 with a first force; a second plunger 40 is movable relative to the first chassis portion 32; and second means 42 is provided for biasing the second plunger 40 away from the second chassis portion 34 with a second force. In one aspect of the disclosure, which may include at least a portion of the subject matter of any of the preceding and/or following examples and aspects, the first force is substantially equal to the second force. The apparatus 20 is used to apply compliant, but efficient, clamping forces to react friction stir welding process loads, allowing the welded workpieces 22a, 22b to thermally expand as a result of the heat input from the actual friction stir welding process. Because welds vary in thickness and complexity, the process clamping load compliancy force must also change, thus the apparatus 20 applies variable and interchangeable reactive force suitable to the opposite process force.

The surface 26 has a planar top surface 43. The first and second workpieces 22a, 22b have a planar top surface 44a, 44b, a planar bottom surface 46a, 46b, a first end 48a, 48b and a second end 50a, 50b. The bottom surfaces 46a, 46b lay on the planar top surface 43 of surface 26 during the friction stir welding process. The workpieces 22a, 22b can be formed of a variety of materials, such as any material that can be welded. In other embodiments, the workpieces 22a, 22b can be made of varying materials. The second end 50a of the first workpiece 22a is abutted against the second end 50b of the second workpiece 22b and the abutted ends 50a, 50b are welded together during the friction stir welding process. The bottom surfaces 46a, 46b of the workpieces lay on the surface. The apparatus is used to bias the first workpiece toward the second workpiece during a friction stir welding process. Friction stir welding is well-known and is described in U.S. Pat. No. 5,460,317, the contents of which are incorporated herein in its entirety.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

The apparatus 20 abuts against the first end 48a of the first workpiece 22a and biases the first workpiece 22a toward the second workpiece 22b during the friction stir welding process. Referring particularly to FIGS. 2 and 3, in one aspect of the disclosure, which may include at least a portion of the subject matter of any of the preceding and/or following examples and aspects, the apparatus 20 further includes a plurality of stops 52 abutting the first end 48b of the second workpiece 22b and not movable in the first direction 24 relative to the surface 26. The stops 52 may be adjustable relative to the surface 26 to adjust the position of the second workpiece 22b relative to the first workpiece 22a along the surface 26. Each stop 52 is aligned with a chassis 30 along the direction 24.

The first chassis portion 32 is generally formed as a block having a first end 54 and a second opposite end 56. The first chassis portion 32 has first and second passageways 58, 60 which extend therethrough from the first end 54 to the second end 56. Each of the first and second passageways 58, 60 have a first section 62 which extends from the first end 54 of the first chassis portion 32 to a second section 64 which extends from the first section 62 to the second end 56 of the first chassis portion 32. The second section 64 terminates in a wall 65 at its end. The second section 64 is larger in dimension than the first section 62.

The second chassis portion 34 is generally formed as a block having a first end 66 and a second opposite end 68. The second chassis portion 34 has first and second passageways 70, 72 which extend therethrough from the first end 66 to the second end 68. Each of the first and second passageways 70, 72 have a first section 74 which extends from the first end 66 of the second chassis portion 34 to a second section 76 which extends from the first section 74 to the second end 68 of the second chassis portion 34. The second section 76 terminates in a wall 77 at its end. The second section 76 is larger in dimension than the first section 74. The second section 76 preferably has the same dimension as the first section 62 of the passageways 58, 60 in the first chassis portion 32.

The first passageway 58 of the first chassis portion 32 aligns with the first passageway 70 of the second chassis portion 34, and the second passageway 60 of the first chassis portion 32 aligns with the second passageway 72 of the second chassis portion 34. The first passageways 58/70 and the second passageways 60/72 are spaced, preferably equidistantly spaced, away from a centerline 78 of the chassis 30 which extends from the first end 54 of the first chassis portion 32 to the second end 68 of the second chassis portion 34.

The first plunger 36 and the first means for biasing 38 seat within the aligned first passageways 58/70. Likewise, the second plunger 40 and the second means for biasing 42 seat within the aligned second passageways 60/72.

Each plunger 36, 40 includes a workpiece engaging head 80 mounted on a shank 82. The respective workpiece engaging head 80 can slide along the shank 82. The workpiece engaging heads 80 seat within the second sections 64 of the passageways 58, 60, and can slide along the length of the second sections 64 until the heads 80 engage the walls 65. The workpiece engaging heads 80 extend outwardly in the first direction 24 from the second sections 64 of the passageways 58, 60. The respective shank 82 extends from the respective workpiece engaging head 80, through the respective first sections 64 of the passageways 58, 60, through the respective second sections 62 of the passageways 58, 60, between the chassis portions 32, 34, through the respective second sections 76 of the passageways 70, 72 and through the first sections 74 of the passageways 70, 72. The shanks 82 threadedly engage with a threaded section 84 of the first sections 74. A jam nut 86 is threadedly connected to a threaded end 88 of each threaded shank 82 and abuts against the first end 66 of the second chassis portion 34.

The first means for biasing 38 seats within the first section 64 of the passageway 58, through the second section 62 of the passageway 58, between the chassis portions 32, 34, and into the second section 76 of the passageway 70. The first means for biasing 38 engages with the head 80 of the first plunger 36 and against the wall 77 of the second section 76. Likewise, the second means for biasing 42 seats within the first section 64 of the passageway 60, through the second section 62 of the passageway 60, between the chassis portions 32, 34, and into the second section 76 of the passageway 72. The second means for biasing 42 engages with the head 80 of the second plunger 40 and against the wall 77 of the second section 76. As used herein, "to bias" means to continuously apply a force, which may or may not have a constant magnitude. As used herein, "means for biasing" may include a spring. The spring may be a coil spring, a leaf spring, a conical or undulating washer, such as a Belleville washer, or still another mechanical, metallic, or resilient elastomeric spring arrangement. Alternatively, instead of or in addition to the spring, the means for biasing 38, 40 may include a gas spring or a magnetic repulsion arrangement. The means for biasing 38, 40 may include an active or powered element, such as a solenoid device or electromagnetic field, pressurized fluid, or a finger, lever, gear, wedge, or other mechanical element moved under power. As used herein, the means for biasing 38, 40 are to be interpreted under 35 U.S.C. 112(f), unless otherwise explicitly stated. It should be noted that examples provided herein of any structure, material, or act in support of any of the means-plus-function clauses, and equivalents thereof, may be utilized individually or in combination. Thus, while various structures, materials, or acts may be described in connection with a means-plus-function clause, any combination thereof or of their equivalents is contemplated in support of such means-plus-function clause.

Referring particularly to FIGS. 2 and 3, in one aspect of the disclosure, which may include at least a portion of the subject matter of any of the preceding and/or following examples and aspects, the chassis 30 is pivotable relative to the surface 26. Referring particularly to FIGS. 2 and 3, in one aspect of the disclosure, which may include at least a portion of the subject matter of any of the preceding and/or following examples and aspects, the chassis 30 is pivotable relative to the surface 26 about a pin 102. Referring particularly to FIGS. 2 and 3, in one aspect of the disclosure, which may include at least a portion of the subject matter of any of the preceding and/or following examples and aspects, the pin 102 is attached to the chassis 30. Referring particularly to FIG. 7, in one aspect of the disclosure, which may include at least a portion of the subject matter of any of the preceding and/or following examples and aspects, the chassis 30 further includes an opening 104 sized to receive the pin 102 with a clearance fit. The opening 104 is provided in the first chassis portion 32 and is preferably aligned with the centerline 78 of the chassis 30 and is proximate to the second end 56 of the first chassis portion 32. The engagement of the pin 102 through the first chassis portion 32 attaches the first chassis portion 32 to the surface 26, but allows for the chassis 30 to pivot relative to the surface 26 as described herein.

Referring particularly to FIG. 7, in one aspect of the disclosure, which may include at least a portion of the subject matter of any of the preceding and/or following examples and aspects, the second chassis portion 34 is movable relative to the first chassis portion 32 to adjust the first force and the second force, and the first force and the second force are inversely proportional to a distance between the first chassis portion 32 and the second chassis portion 34.

The first chassis portion 32 includes a threaded blind bore 90 which extends a predetermined distance from the first end 54 of the first chassis portion 32 toward the second end 56. The second chassis portion 34 includes a threaded passageway 92 which extends from the first end 66 of the second chassis portion 34 to the second end 68. The bore 90 and the passageway 92 are aligned with each other and have a centerline which aligns with the centerline 78 of the chassis 30.

Referring particularly to FIG. 7, in one aspect of the disclosure, which may include at least a portion of the subject matter of any of the preceding and/or following examples and aspects, an adjuster 94 is associated with the first chassis portion 32 and the second chassis portion 34. Referring particularly to FIG. 7, in one aspect of the disclosure, which may include at least a portion of the subject matter of any of the preceding and/or following examples and aspects, the adjuster 94 includes a shank 96 and a receiver 98, coupled to the shank 96. The shank 96 is threaded and the receiver 98 is internally threaded. Referring particularly to FIG. 7, in one aspect of the disclosure, which may include at least a portion of the subject matter of any of the preceding and/or following examples and aspects, the shank 96 is fixed relative to the first chassis portion 32 and the receiver 98 is threadably movable relative to the shank 96 and contacts the second chassis portion 34.

The shank 96 seats within the bore 90 and the passageway 92. The receiver 98, which may take the form of an adjustable clamp pressure nut, is attached to an end 100 of the shank 96 that extends outwardly from the second chassis portion 34 in a direction opposite to the first direction 24. When the shank 96 is rotated and the first chassis portion 32 is attached relative to the surface 26 via the pin 102, the second chassis portion 34 is moved toward or away from the first chassis portion 32. When the head 80 of the plungers 36, 40 abut against the first end 48a of the first workpiece 22a and the distance between the first chassis portion 32 and the second chassis portion 34 is altered, this alters the amount of distance the means for biasing 38, 42 can travel, thereby altering the forces exerted by means for biasing 38, 42 on the heads 80 of the plungers 38, 40.

Referring particularly to FIG. 7, in one aspect of the disclosure, which may include at least a portion of the subject matter of any of the preceding and/or following examples and aspects, the first chassis portion 32 includes a fixed shoulder 106 facing in the first direction 24 along the surface 26. Referring particularly to FIG. 7, in one aspect of the disclosure, which may include at least a portion of the subject matter of any of the preceding and/or following examples and aspects, the fixed shoulder 106 is located between the first plunger 36 and the second plunger 40 when viewed along a second direction substantially perpendicular to the first direction 24 and to the surface 26. The shoulder 106 extends outwardly in the first direction 24 from the second end 56 of the first chassis portion 32 and an end surface 110 of the shoulder 106 is parallel to the first end 48a of the first workpiece 22a when the apparatus 20 abuts against the first end 48a of the workpiece 22a.

Referring particularly to FIG. 8, in one aspect of the disclosure, which may include at least a portion of the subject matter of any of the preceding and/or following examples and aspects, the first chassis portion 32 includes a flange 112 extending in the first direction 24 along the surface 26, and the flange 112 includes an aperture 114 in visual communication with the fixed shoulder 106 when viewed along a second direction substantially perpendicular to the first direction 24 and to the surface 26. When the apparatus 20 abuts against the first end 48a of the first workpiece 22a, the flange 112 overlays the top surface 44a of the first workpiece 22a.

Referring particularly to FIGS. 2 and 3, in one aspect of the disclosure, which may include at least a portion of the subject matter of any of the preceding and/or following examples and aspects, the apparatus 20 is a first apparatus and the apparatus 20 further comprises at least one second apparatus 20 substantially identical to the first apparatus 20. Referring particularly to FIGS. 2 and 3, in one aspect of the disclosure, which may include at least a portion of the subject matter of any of the preceding and/or following examples and aspects, the first apparatus 20 and the at least one second apparatus 20 are located along the first side 48a of the first workpiece 22a.

A handle 116 may be provided to engage the pin 102 with the surface 26.

Now that the specifics of the apparatus(es) 20 has been described, the method of using the apparatus(es) 20 will be described with regard to one of the apparatuses 20 as shown in FIG. 11. The workpieces 22a, 22b are laid on the top surface 43 of the surface 26 such that the bottom surfaces 46a, 46b of the workpieces 22a, 22b abut against the top surface 43 of the surface 26. Referring particularly to FIG. 11, one example of the disclosure relates to a method of processing the first workpiece 22a and the second workpiece 22b includes constraining the second workpiece 22b to be incapable of moving in the first direction 24 along the surface 26; abutting the second edge 50b of the first workpiece 22a against the second edge 50b of the second workpiece 22b to form a joint; applying a first selectively adjustable force and a second selectively adjustable force against the first edge 48a of the first workpiece 22a to bias the second edge 50a of the first workpiece 22a against the second edge 50a of the second workpiece 22b; friction stir welding the first workpiece 22a to the second workpiece 22b along the joint; maintaining the first selectively adjustable force and the second selectively adjustable force equal to each other while friction stir welding the first workpiece 22a to the second workpiece 22b along the joint; and automatically varying at least one of the first selectively adjustable force and the second selectively adjustable force responsive to thermal size variations of the first workpiece 22a and the second workpiece 22b associated with friction stir welding the first workpiece 22a to the second workpiece 22b. The position of the second workpiece 22b is constrained to be incapable of moving in the first direction 24 along the surface 26 by the stops 26. The second workpiece 22a is further constrained from movement in the direction opposite to the first direction 24 by abutting the second edge 50b of the first workpiece 22a against the second edge 50b of the second workpiece 22b to form a joint. The first selectively adjustable force and the second selectively adjustable force are applied by the apparatus 20 against the first edge 48a of the first workpiece 22a to bias the second edge 50a of the first workpiece 22a against the second edge 50a of the second workpiece 22b. The apparatus 20 is attached to the surface 26 via the pin 102 and the plungers 36, 40 abut against the first edge 48a of the first workpiece 22a. The means for biasing 38, 42 bias the heads 80 of the plungers 36, 40 against the first workpiece 22a. The first workpiece 22a is friction stir welded to the second workpiece 22b along the joint in a known manner. The first selectively adjustable force provided by the first means for biasing 38 and the second selectively adjustable force provided by the second means for biasing 42 are equal to each other while friction stir welding the first workpiece 22a to the second workpiece 22b along the joint. When the first workpiece 22a moves in a direction opposite to the first direction 24, the means for biasing 38, 42 allow the heads 80 of the plungers 38, 40 to move relative to the shanks 82 to compensate for the thermal expansion, while still bearing against the first end 48a of the first workpiece 22a.

In one aspect of the disclosure, which may include at least a portion of the subject matter of any of the preceding and/or following examples and aspects, the method includes monitoring a distance between the first edge 48a of the first workpiece 22a and a predetermined location along the surface 26. This can be effected by an installer viewing the distance between the end surface 110 of the fixed shoulder 108 and the first end 48a of the first workpiece 22a. The installer can view this distance through the aperture 114.

In one aspect of the disclosure, which may include at least a portion of the subject matter of any of the preceding and/or following examples and aspects, the method includes constraining the first workpiece 22a to be incapable of moving in a direction opposite to the first direction 24 when the distance between the first edge 48a of the first workpiece 22a and the predetermined location along the surface 26 is zero. When the first workpiece 22a moves in the direction opposite to the first direction 24 during the friction stir welding process of joining the workpieces 22a 22b, if the first workpiece 22a moves too far in a direction opposite to the first direction 24 from the second workpiece 22b, the first end 48a of the first workpiece 22a will abut against the end surface 110 of the fixed shoulder 108 thereby preventing the further movement of the first workpiece 22a moves in the direction opposite to the first direction 24 during the friction stir welding process to aid in preventing voids into the welded joint.

In one aspect of the disclosure, which may include at least a portion of the subject matter of any of the preceding and/or following examples and aspects, the method includes applying a third selectively adjustable force and a fourth selectively adjustable force against the first edge 48a of the first workpiece 22a to bias the second edge 50a of the first workpiece 22a against the second edge 50b of the second workpiece 22a. In one aspect of the disclosure, which may include at least a portion of the subject matter of any of the preceding and/or following examples and aspects, the method includes maintaining the third selectively adjustable force and the fourth selectively adjustable force equal to each other while friction stir welding the first workpiece 22a to the second workpiece 22b along the joint. In one aspect of the disclosure, which may include at least a portion of the subject matter of any of the preceding and/or following examples and aspects, the method includes automatically varying at least one of the third selectively adjustable force and the fourth selectively adjustable force responsive to thermal size variations of the first workpiece 22a and the second workpiece 22b associated with friction stir welding the first workpiece 22a to the second workpiece 22b. This third and fourth adjustable forces are provided by providing another apparatus 20 along the length of the first workpiece 22a.

The apparatus 20 is portable, self-contained and is easily incorporated into a variety of friction stir welding/machining clamping/fixture systems.

The means for biasing 38, 42 can be changed to other means for biasing with other tolerances. The specifications for the means for biasing 38, 42 are determined by the thickness and workpiece material type being welded.

If desired, a clamp 118 can be provided to overlay the top surface 44a, 44b of each workpiece 22a, 22b. The clamps 118 are connected to the surface 26 at the ends of the clamps 118. The clamps 118 do not overlay the joint at the abutted ends 48a, 50b where the friction stir welding will occur. The clamps 118 push downwardly on the top surfaces 44a, 44b of the workpieces 22a, 22b and frictionally engage the workpieces 22a, 22b. The clamps 118 prevent the workpieces 22a, 22b from buckling during the friction stir welding process.

The disclosure and drawing figure(s) describing the operations of the method(s) set forth herein should not be interpreted as necessarily determining a sequence in which the operations are to be performed. Rather, although one illustrative order is indicated, it is to be understood that the sequence of the operations may be modified when appropriate. Accordingly, certain operations may be performed in a different order or simultaneously. Additionally, in some aspects of the disclosure, not all operations described herein need be performed.

Examples of the disclosure may be described in the context of an aircraft manufacturing and service method 1100 as shown in FIG. 5 and an aircraft 1102 as shown in FIG. 6. During pre-production, illustrative method 1100 may include specification and design 1104 of the aircraft 1102 and material procurement 1106. During production, component and subassembly manufacturing 1108 and system integration 1110 of the aircraft 1102 take place. Thereafter, the aircraft 1102 may go through certification and delivery 1112 to be placed in service 1114. While in service by a customer, the aircraft 1102 is scheduled for routine maintenance and service 1116 (which may also include modification, reconfiguration, refurbishment, and so on).

Each of the processes of the illustrative method 1100 may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

As shown in FIG. 6, the aircraft 1102 produced by the illustrative method 100 may include an airframe 1118 with a plurality of high-level systems 1120 and an interior 1122a. Examples of high-level systems 1120 include one or more of a propulsion system 1124, an electrical system 1126, a hydraulic system 1122b, and an environmental system 1130. Any number of other systems may be included. Although an aerospace example is shown, the principles of the invention may be applied to other industries, such as the automotive industry.

Apparatus and methods shown or described herein may be employed during any one or more of the stages of the manufacturing and service method 1100. For example, components or subassemblies corresponding to component and subassembly manufacturing 1108 may be fabricated or manufactured in a manner similar to components or subassemblies produced while the aircraft 1102 is in service. Also, one or more aspects of the apparatus, method, or combination thereof may be utilized during the production states 1108 and 1110, for example, by substantially expediting assembly of or reducing the cost of an aircraft 1102. Similarly, one or more aspects of the apparatus or method realizations, or a combination thereof, may be utilized, for example and without limitation, while the aircraft 1102 is in service, e.g., maintenance and service 1116.

Different examples and aspects of the apparatus and methods are disclosed herein that include a variety of components, features, and functionality. It should be understood that the various examples and aspects of the apparatus and methods disclosed herein may include any of the other components, features, and functionality of any of the other examples and aspects of the apparatus and methods disclosed herein in any combination, and all of such possibilities are intended to be within the spirit and scope of the present disclosure.

Many modifications and other examples of the disclosure set forth herein will come to mind to one skilled in the art to which the disclosure pertains having the benefit of the teachings presented in the foregoing descriptions and the associated drawings.

Therefore, it is to be understood that the disclosure is not to be limited to the specific embodiments disclosed and that modifications and other embodiments are intended to be included within the scope of the appended claims. Moreover, although the foregoing descriptions and the associated drawings describe example embodiments in the context of certain illustrative combinations of elements and/or functions, it should be appreciated that different combinations of elements and/or functions may be provided by alternative implementations without departing from the scope of the appended claims.

What is claimed is:

1. A method of processing a first workpiece, including a first edge and a second edge, and a second workpiece, including a first edge and a second edge, the method comprising:
   constraining the second workpiece to be incapable of moving in a first direction along a surface;
   abutting the second edge of the first workpiece against the second edge of the second workpiece to form a joint;
   applying a first selectively adjustable force and a second selectively adjustable force against the first edge of the first workpiece to bias the second edge of the first workpiece against the second edge of the second workpiece;
   forming a butt weld by friction stir welding the first workpiece to the second workpiece along the joint;
   maintaining the first selectively adjustable force and the second selectively adjustable force equal to each other while friction stir welding the first workpiece to the second workpiece along the joint; and
   automatically varying at least one of the first selectively adjustable force and the second selectively adjustable force responsive to thermal size variations of the first workpiece and the second workpiece associated with friction stir welding the first workpiece to the second workpiece.

2. A method of processing a first workpiece, including a first edge and a second edge, and a second workpiece, including a first edge and a second edge, the method comprising:
   constraining the second workpiece to be incapable of moving in a first direction along a surface;
   abutting the second edge of the first workpiece against the second edge of the second workpiece to form a joint;
   applying a first selectively adjustable force and a second selectively adjustable force against the first edge of the first workpiece to bias the second edge of the first workpiece against the second edge of the second workpiece;
   forming a butt weld by friction stir welding the first workpiece to the second workpiece along the joint;
   maintaining the first selectively adjustable force and the second selectively adjustable force equal to each other while friction stir welding the first workpiece to the second workpiece along the joint;
   automatically varying at least one of the first selectively adjustable force and the second selectively adjustable force responsive to thermal size variations of the first workpiece and the second workpiece associated with friction stir welding the first workpiece to the second workpiece; and
   monitoring a distance between the first edge of the first workpiece and a predetermined location along the surface.

3. The method of claim 2, further comprising constraining the first workpiece to be incapable of moving in a direction opposite to the first direction when the distance between the first edge of the first workpiece and the predetermined location along the surface is zero.

4. A method of processing a first workpiece, including a first edge and a second edge, and a second workpiece, including a first edge and a second edge, the method comprising:
   constraining the second workpiece to be incapable of moving in a first direction along a surface;
   abutting the second edge of the first workpiece against the second edge of the second workpiece to form a joint;
   applying a first selectively adjustable force and a second selectively adjustable force against the first edge of the first workpiece to bias the second edge of the first workpiece against the second edge of the second workpiece;
   applying a third selectively adjustable force and a fourth selectively adjustable force against the first edge of the first workpiece to bias the second edge of the first workpiece against the second edge of the second workpiece;
   forming a butt weld by friction stir welding the first workpiece to the second workpiece along the joint;
   maintaining the first selectively adjustable force and the second selectively adjustable force equal to each other while friction stir welding the first workpiece to the second workpiece along the joint; and
   automatically varying at least one of the first selectively adjustable force and the second selectively adjustable force responsive to thermal size variations of the first workpiece and the second workpiece associated with friction stir welding the first workpiece to the second workpiece.

5. The method of claim 4, further comprising maintaining the third selectively adjustable force and the fourth selectively adjustable force equal to each other while friction stir welding the first workpiece to the second workpiece along the joint.

6. The method of claim 4, further comprising automatically varying at least one of the third selectively adjustable force and the fourth selectively adjustable force responsive to thermal size variations of the first workpiece and the second workpiece associated with friction stir welding the first workpiece to the second workpiece.

7. The method of claim 1, wherein applying the first selectively adjustable force to the first edge of the workpiece comprises applying the first selectively adjustable force through a first spring; and
wherein applying the second selectively adjustable force to the first edge of the workpiece comprises applying the second selectively adjustable force through a second spring.

8. The method of claim 7, wherein applying the first selectively adjustable force to the first edge of the workpiece comprises moving the first spring relative to the first edge of the workpiece; and
wherein applying the second selectively adjustable force to the first edge of the workpiece comprises moving the second spring relative to the first edge of the workpiece.

9. The method of claim 7, wherein the first spring and the second spring are identical.

10. The method of claim 7, wherein the first spring resiliently deforms in response to the thermal size variations and automatically varies the first selectively adjustable force in response to the deformation; and
wherein the first spring resiliently deforms in response to the thermal size variations and automatically varies the second selectively adjustable force in response to the deformation.

11. The method of claim 2, further comprising:
applying a third selectively adjustable force and a fourth selectively adjustable force against the first edge of the first workpiece to bias the second edge of the first workpiece against the second edge of the second workpiece; and
maintaining the third selectively adjustable force and the fourth selectively adjustable force equal to each other while friction stir welding the first workpiece to the second workpiece along the joint.

12. The method of claim 11, further comprising:
applying a third selectively adjustable force and a fourth selectively adjustable force against the first edge of the first workpiece to bias the second edge of the first workpiece against the second edge of the second workpiece; and
automatically varying at least one of the third selectively adjustable force and the fourth selectively adjustable force responsive to thermal size variations of the first workpiece and the second workpiece associated with friction stir welding the first workpiece to the second workpiece.

13. The method of claim 2, wherein applying the first selectively adjustable force to the first edge of the workpiece comprises applying the first selectively adjustable force through a first spring; and
wherein applying the second selectively adjustable force to the first edge of the workpiece comprises applying the second selectively adjustable force through a second spring.

14. The method of claim 13, wherein applying the first selectively adjustable force to the first edge of the workpiece comprises moving the first spring relative to the first edge of the workpiece; and
wherein applying the second selectively adjustable force to the first edge of the workpiece comprises moving the second spring relative to the first edge of the workpiece.

15. The method of claim 13, wherein the first spring and the second spring are identical.

16. The method of claim 13, wherein the first spring resiliently deforms in response to the thermal size variations and automatically varies the first selectively adjustable force in response to the deformation; and
wherein the second spring resiliently deforms in response to the thermal size variations and automatically varies the second selectively adjustable force in response to the deformation.

17. The method of claim 4, further comprising monitoring a distance between the first edge of the first workpiece and a predetermined location along the surface.

18. The method of claim 17, further comprising constraining the first workpiece to be incapable of moving in a direction opposite to the first direction when the distance between the first edge of the first workpiece and the predetermined location along the surface is zero.

19. The method of claim 4, wherein applying the first selectively adjustable force to the first edge of the workpiece comprises applying the first selectively adjustable force through a first spring; and
wherein applying the second selectively adjustable force to the first edge of the workpiece comprises applying the second selectively adjustable force through a second spring;
wherein applying the third selectively adjustable force to the first edge of the workpiece comprises applying the third selectively adjustable force through a third spring; and
wherein applying the fourth selectively adjustable force to the first edge of the workpiece comprises applying the fourth selectively adjustable force through a fourth spring.

20. The method of claim 18, wherein applying the first selectively adjustable force to the first edge of the workpiece comprises moving the first spring relative to the first edge of the workpiece; and
wherein applying the second selectively adjustable force to the first edge of the workpiece comprises moving the second spring relative to the first edge of the workpiece;
wherein applying the third selectively adjustable force to the first edge of the workpiece comprises moving the third spring relative to the first edge of the workpiece; and
wherein applying the fourth selectively adjustable force to the first edge of the workpiece comprises moving the fourth spring relative to the first edge of the workpiece.

21. The method of claim 19, wherein the first spring, the second spring, the third spring, and the fourth spring are identical.

22. The method of claim 19, wherein the first spring resiliently deforms in response to the thermal size variations and automatically varies the first selectively adjustable force in response to the deformation;
wherein the first spring resiliently deforms in response to the thermal size variations and automatically varies the second selectively adjustable force in response to the deformation;
wherein the third spring resiliently deforms in response to the thermal size variations and automatically varies the third selectively adjustable force in response to the deformation; and
wherein the fourth spring resiliently deforms in response to the thermal size variations and automatically varies the fourth selectively adjustable force in response to the deformation.

* * * * *